June 5, 1951     C. E. BENNETT ET AL     2,555,840
HERMETICALLY SEALED REEL
Filed Sept. 21, 1946
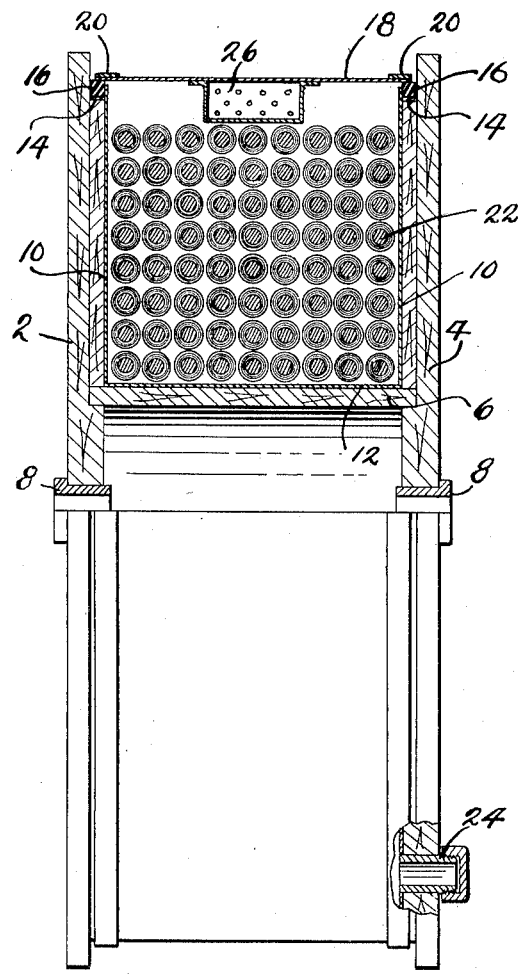
INVENTORS.
CHARLES E. BENNETT
PAUL V. WHITE
By James G. Bethell.

Patented June 5, 1951

2,555,840

UNITED STATES PATENT OFFICE 2,555,840

HERMETICALLY SEALED REEL

Charles E. Bennett, Ridgewood, and Paul V. White, Rochelle Park, N. J., assignors to The Okonite-Callender Cable Company, Incorporated, Paterson, N. J., a corporation of New Jersey Application September 21, 1946, Serial No. 698,576

2 Claims. (Cl. 312—31)

This invention relates to shipping packages and particularly to cable reels.

One of the objects of our invention is to provide a cable reel of such construction that unsheathed cable can be shipped thereon without becoming damaged in transit by dirt, moisture and the like.

More particularly our invention is directed to an improved reel for shipping cables which are to be loosely installed in a pipe line which is maintained filled with oil or other insulating fluid under high pressure, such as 200 to 225 pounds per square inch.

The conductors of this type of electric power cable are customarily insulated with tape such as paper tape for example, which is wrapped helically about the conductor, layer upon layer until the desired wall thickness of insulation is built up. The cable is then subjected to evacuation and impregnation and enclosed in a temporary metal sheath for shipment to the installation site. The purpose of the temporary sheath is to protect the cable against the entry of moisture or other contaminating material. The sheath, however, must be removed before the cable is installed inasmuch as in this type of cable the conductors are drawn into a pipe line kept filled with insulating fluid under pressure which permeates the cable.

The application of the sheath originally is expensive in labor and materials; the weight of the sheath which is customarily lead, adds to shipping costs; the removal of the sheath at the installation site requires special equipment and skill; and finally the sheath must be disposed of either by shipment back to the cable plant for re-melting or sale for junk at the installation site.

Our invention eliminates the necessity for a temporary sheath of any sort and yet the cable is adequately maintained against injury of any sort.

Broadly speaking, our invention provides a reel upon which the unsheathed cable is coiled, this reel then being sealed hermetically against the entry of foreign material of any kind. After the cable is coiled upon the reel and the reel sealed we may then withdraw the air from the enclosure thus provided and substitute a $CO_2$ or similar gas, and whether or not the reel is exhausted of air we prefer to install perforated cylinders or containers of silica gel within the reel enclosure for absorbing any moisture within the reel enclosure.

In the accompanying drawing an embodiment of our invention has been illustrated in sectional elevation.

Referring to the drawing in detail, 2 and 4 designate the heads or flanges of our improved reel, and 6 the hub. The flanges 2 and 4 are provided with bearings 8 of some sort for the reception of a bar or rod by which the reel may be supported for rotation. This is conventional construction.

The flanges and hub of the reel as illustrated are of wood. The reel may be of metal if desired. When a wooden reel is employed we line the same with metal as shown at 10 and 12. The metal lining sheets or plates terminate an appreciable distance short of the periphery of the reel heads or flanges, and each sheet short of its periphery is provided with an annular flange as shown at 14 to provide space for the reception of sealing gaskets 16 which are stretched about each lining plate. These gaskets are of rubber or other suitable material, or any suitable cross section and may be either solid as shown or hollow.

Bent around the reel is a metal plate or sheet 18. This sheet extends from one reel head to the other so that it overlaps the gaskets 16. The ends of the enclosing sheet 18 are brought together either in overlapping or abutting relation and welded or soldered.

At the two edges of the housing sheet 18 we wrap a metal band 20. This is drawn down tightly and soldered or welded in place.

It will be appreciated in applying the housing sheet 18 it is drawn down as tightly as possible so as to compress the gaskets 16, and after the bands 20 are applied the reel is hermetically sealed.

The cable is designated 22, and comprises a conductor insulated with paper or other suitable insulating material. The cable is evacuated and impregnated at the cable plant in accordance with conventional practice, and is coiled about the reel hub, the usual temporary sheath, however, being omitted.

In addition to the foregoing, one head of the reel is provided with a capped pipe 24 which extends to the reel interior. This is for the purpose of evacuating the reel after the cable has been reeled.

26 designates containers of silica gel or other highly moisture absorbent material for absorbing any moisture which may be left within the reel enclosure.

If desired, after evacuating the reel enclosure the same may be filled with $CO_2$ or other similar gas which is inert so far as the fluid insulation of the cable is concerned.

It will be appreciated from all of the foregoing that our improved shipping package is novel in its construction and possesses many advantages over the constructions heretofore employed.

The primary advantage of our shipping package over prior structures is the complete elimination of the temporary sheath with all of its attendant disadvantages. It will be appreciated furthermore, that the cable is protected against the entry of deleterious materials more adequately and completely than shipping packages of this general type as heretofore constructed.

It is to be understood that changes may be made in the details of construction and arrangement of parts herein shown and described within the purview of our invention.

What we claim is:

1. A shipping package comprising in combination a reel, an unsheathed insulated conductor coiled about the reel hub, an annular shoulder on the inner face of each reel head above the level of the coiled cable conductor, a gasket about each shoulder, an imperforate metal sheet about the conductor having its edges resting upon said gasket, metal binding tapes about the metal sheet immediately above the gaskets to provide a hermetic seal, and a connection to the interior of the sealed enclosure thus provided for the attachment of pressure reducing means thereto.

2. A shipping package comprising a metal lined wooden reel, the lining for the reel heads terminating short of the periphery of each head to provide an annular shoulder on the inner face of each head, a gasket about each shoulder, an unsheathed insulated conductor coiled about the reel hub, an imperforate metal sheet wrapped about the coiled conductor, said sheet resting upon the gaskets, metal binding tapes about the metal sheet for drawing and binding the sheet in sealing engagement with the gaskets to provide a hermetically sealed enclosure containing the cable conductor, said enclosure being under reduced pressure, and containers of moisture-absorbent material within the enclosure.

CHARLES E. BENNETT.
PAUL V. WHITE.

REFERENCES CITED

The following references are of record in the file of this patent:

UNITED STATES PATENTS

| Number | Name | Date |
|---|---|---|
| 374,734 | Eitapenc | Dec. 13, 1887 |
| 384,327 | Millar | June 12, 1888 |
| 1,243,229 | Shonberg | Oct. 16, 1917 |
| 2,080,066 | Sheppard | May 11, 1937 |
| 2,172,056 | Bureau | Sept. 5, 1939 |

FOREIGN PATENTS

| Number | Country | Date |
|---|---|---|
| 849,261 | France | Nov. 17, 1939 |